(12) United States Patent
Deluca et al.

(10) Patent No.: US 10,757,631 B2
(45) Date of Patent: *Aug. 25, 2020

(54) PAUSING FUNCTIONS OF AN ASSISTANT DEVICE DURING AN ACTIVE TELEPHONE CALL

(71) Applicant: INTERNATIONAL BUSINESS MACHINES CORPORATION, Armonk, NY (US)

(72) Inventors: Lisa Seacat Deluca, Baltimore, MD (US); Jeremy A. Greenberger, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,015

(22) Filed: Oct. 29, 2019

(65) Prior Publication Data

US 2020/0068476 A1 Feb. 27, 2020

Related U.S. Application Data

(63) Continuation of application No. 16/415,305, filed on May 17, 2019, which is a continuation of application
(Continued)

(51) Int. Cl.
*H04M 3/42* (2006.01)
*H04W 48/02* (2009.01)
(Continued)

(52) U.S. Cl.
CPC ............ *H04W 48/02* (2013.01); *G06F 3/165* (2013.01); *G10L 15/22* (2013.01); *G10L 25/87* (2013.01);
(Continued)

(58) Field of Classification Search
CPC ....... H04W 48/02; H04W 24/08; G06F 3/165; G10L 15/22; G10L 25/87; G10L 2015/228; H04L 12/282; H04L 12/2821
See application file for complete search history.

(56) References Cited

U.S. PATENT DOCUMENTS 7,366,549 B2 4/2008 Lee et al.
7,822,387 B2 10/2010 Gross
(Continued)

OTHER PUBLICATIONS

Anonymous, "Amazon Echo Questions & Answers—Timeline", https://www.facebook.com/permalink.php?id=632829106858957&story_fbid=633600950115106, accessed Feb. 17, 2017, 5 pages.
(Continued)

*Primary Examiner* — Barry W Taylor
(74) *Attorney, Agent, or Firm* — Maeve Carpenter; Andrew D. Wright; Roberts, Calderon, Safran & Cole, P.C.

(57) ABSTRACT

A computer-implemented method includes: monitoring, by a user device, calling activity on the user device; detecting, by the user device and based on the monitoring, that a call has started on the user device; providing, by the user device, a pause instruction to an assistant device based on detecting that the call has started on the user device, causing the assistant device to disable speech response functions; detecting, by the user device and based on the monitoring, that the call has ended on the user device; and providing, by the user device, a resume instruction to the assistant device based on detecting that the call has ended on the user device, causing the assistant device to resume speech response functions.

20 Claims, 10 Drawing Sheets

Related U.S. Application Data

No. 16/171,666, filed on Oct. 26, 2018, now Pat. No. 10,368,292, which is a continuation of application No. 15/437,063, filed on Feb. 20, 2017, now Pat. No. 10,178,603.

(51) Int. Cl.

| | | |
|---|---|---|
| *H04W 24/08* | (2009.01) | |
| *G10L 15/22* | (2006.01) | |
| *G06F 3/16* | (2006.01) | |
| *H04L 29/06* | (2006.01) | |
| *G10L 25/87* | (2013.01) | |
| *H04L 12/28* | (2006.01) | |
| *H04L 29/08* | (2006.01) | |

(52) U.S. Cl.
CPC ........ *H04L 12/282* (2013.01); *H04L 12/2821* (2013.01); *H04L 65/1059* (2013.01); *H04L 67/10* (2013.01); *H04W 24/08* (2013.01); *G06F 3/167* (2013.01); *G10L 2015/228* (2013.01)

(56) References Cited

U.S. PATENT DOCUMENTS

| | | |
|---|---|---|
| 8,001,288 B2 | 8/2011 | Cortopassi et al. |
| 9,548,053 B1 | 1/2017 | Basye et al. |
| 9,818,407 B1 | 11/2017 | Secker-Walker et al. |
| 10,178,603 B2 | 1/2019 | Deluca et al. |
| 10,368,292 B2 | 7/2019 | Deluca et al. |
| 2005/0267759 A1 | 12/2005 | Jeschke et al. |
| 2006/0259305 A1 | 11/2006 | Pietruszka |
| 2009/0138507 A1* | 5/2009 | Burckart ............ G11B 27/105 |
| 2012/0016678 A1 | 1/2012 | Gruber et al. |
| 2013/0051543 A1 | 2/2013 | McDysan et al. |
| 2014/0143424 A1* | 5/2014 | Rostaing ............ H04L 41/24 709/226 |
| 2014/0187221 A1 | 7/2014 | Ramachandran |
| 2014/0266637 A1 | 9/2014 | Alsina et al. |
| 2014/0365018 A1 | 12/2014 | Kusukame et al. |
| 2017/0041730 A1 | 2/2017 | Seligmann et al. |
| 2017/0084273 A1* | 3/2017 | Zohar ............ G10L 15/22 |
| 2018/0032997 A1* | 2/2018 | Gordon ............ G06Q 20/3224 |
| 2018/0242219 A1 | 8/2018 | Deluca et al. |
| 2019/0069217 A1 | 2/2019 | Deluca et al. |
| 2019/0274087 A1* | 9/2019 | Deluca ............ H04W 24/08 |

OTHER PUBLICATIONS

Anonymous, "Amazon Echo", https://www.reddit.com/r/amazonecho/comments/3lzoqf/anyone_else_noticing_way_more_false_positives_for/, Reddit, accessed Feb. 15, 2017, 3 pages.

Higginbotham, "Amazon's Echo is a good listener but a wretched assistant", https://gigaom.com/2014/12/12/amazons-echo-is-a-good-listener-but-a-wretched-assistant/, Gigaom, Dec. 12, 2014, 17 pages.

Fitzpatrick, "How to Improve Your Amazon Echo Experience by Training It to Your Voice", https://www.howtogeek.com/235916/how-to-improve-your-amazon-echo-experience-by-training-it-to-your-voice/, How-To Geek, Nov. 4, 2016, 7 pages.

Verger, "What's in a name? For people named Alexa, a new digital connection", http://www.foxnews.com/tech/2017/01/26/whats-in-name-for-people-named-alexa-new-digital-connection.html, Fox News Tech, Jan. 26, 2017, 2 pages.

Mell et al., "The NIST Definition of Cloud Computing", NIST, Special Publication 800-145, Sep. 2011, 7 pages.

List of IBM Patents or Patent Applications Treated as Related, Oct. 28, 2019, 1 page.

* cited by examiner

PAUSING FUNCTIONS OF AN ASSISTANT DEVICE DURING AN ACTIVE TELEPHONE CALL

BACKGROUND

The present invention generally relates to pausing the functions of an assistant device, and, more particularly, to pausing the functions of an assistant device during an active telephone call.

An assistant device is an electronic computing device that performs certain functions, for example, from user voice input. For example, an assistant device may be a component in a smart home or smart facility in which the assistant device is wirelessly connected to a network of home automation devices, computers, etc. The assistant device may respond to verbal commands (e.g., "turn off lights") by mapping the verbal command to an electronic command, and sending the corresponding command to a network-enabled device capable of executing the command. Additionally, or alternatively, an assistant device may provide responses to queries by accessing cloud-based systems via wireless networking.

An assistant device constantly "listens" for a "wake" voice command that activates the functions of the assistant device. Once a wake command is "heard" by the assistant device, the assistant device may output an audible alert indicating that the assistant device is activated and prepared to respond to subsequent voice commands for a period of time.

SUMMARY

In an aspect of the invention, a computer-implemented method includes: monitoring, by a user device, calling activity on the user device; detecting, by the user device and based on the monitoring, that a call has started on the user device; providing, by the user device, a pause instruction to an assistant device based on detecting that the call has started on the user device, causing the assistant device to disable speech response functions; detecting, by the user device and based on the monitoring, that the call has ended on the user device; and providing, by the user device, a resume instruction to the assistant device based on detecting that the call has ended on the user device, causing the assistant device to resume speech response functions.

In an aspect of the invention, there is a computer program product for preventing unintended responses to speech commands by an assistant device during an active telephone call on a user device. The computer program product includes a computer readable storage medium having program instructions embodied therewith, the program instructions executable by a computer device to cause the computer device to: receive a pause instruction from the user device based on the user device detecting that a call as started on the user device; identify one or more assistant devices registered to the user device; provide the pause instruction to the one or more assistant devices, causing the one or more assistant devices to disable speech response functions; receive a resume instruction from the user device based on the user device detecting that a call as started on the user device; and provide the resume instruction to the one or more assistant devices, causing the one or more assistant devices to resume speech response functions.

In an aspect of the invention, a system includes: a CPU, a computer readable memory and a computer readable storage medium associated with a computing device; program instructions to receive a pause instruction based on a user device detecting that a call has started on the user device; program instructions to disable speech input response functions based on receiving the pause instruction; program instructions to receive a resume instruction based on the user device detecting that the call has ended on the user device; and program instructions to resume speech input response functions based on receiving the resume instruction. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
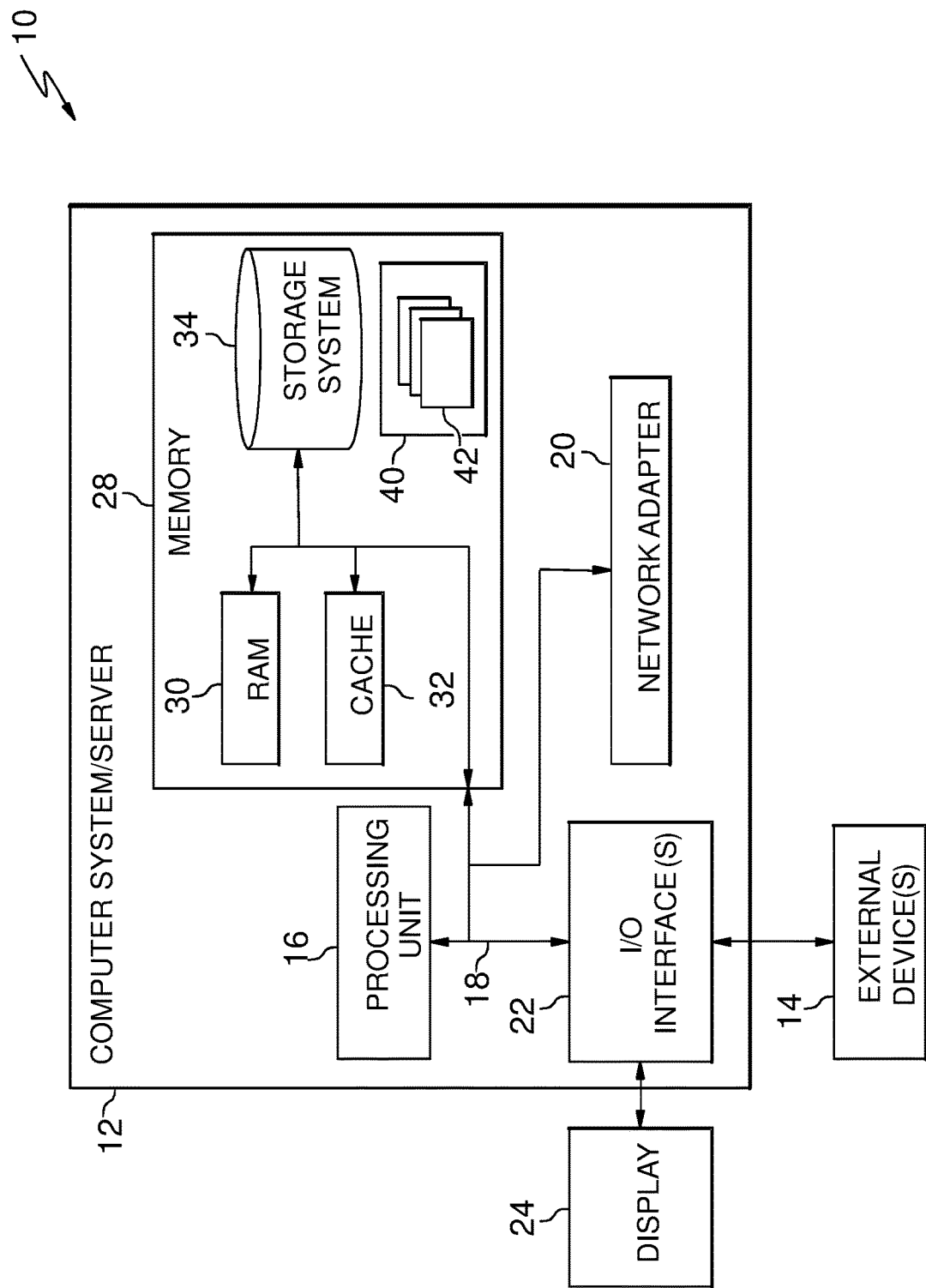
FIG. 1 depicts a cloud computing node according to an embodiment of the present invention.

The present invention generally relates to pausing the functions of an assistant device, and, more particularly, to pausing the functions of an assistant device during an active telephone call. In a situation in which a user is speaking on a telephone call, an assistant device may be erroneously activated when the user speaks a "wake command" during the call. When the assistant device is activated, the assistant device may begin to attempt to respond to user speech (e.g., by executing a command, providing a verbal response to the user's speech, etc.). Thus, user speech may be unintentionally "heard" and responded to by the assistant device, which may unintentionally trigger a command or unintentionally trigger a verbal response from the assistant device and distract the user during a telephone conversation. Aspects of the present invention may pause the functions of the assistant device during an active telephone call. Advantageously, the assistant device may not respond to speech inputs during a telephone call (e.g., speech inputs relating to a "wake command" or other type of command), thereby reducing instances of unintentional actions being performed by the assistant device.

As described herein, a user device (e.g., a smart phone, tablet device, etc. via which telephone calls may be placed or received) may connect with an assistant device. The user device may monitor calling activity, and may provide a pause instruction to the assistant device when an active call begins (e.g., when the user places an outgoing call or answers an incoming call via the user device). Based on receiving the pause instruction, the assistant device may pause functions that would ordinary trigger a response from user speech input. For example, the assistant device may mute its microphone such that no speech input is received. Alternatively, the assistant device may simply ignore speech while the functions are paused/disabled. For example, the assistant device may ignore a wake command or may ignore any speech while the functions are paused. The user device may continue to monitor the calling activity, and may a resume instruction to the assistant device when the call ends. Based on receiving the resume instruction, the assistant device may resume functions (e.g., by un-muting its microphone and/or by resuming to respond to speech received through its microphone).

As described herein, the user device may provide a pause instruction when an active call begins and based on identifying a particular individual that is speaking into the user device. For example, the user device may only provide the pause instruction when a particular individual is speaking into the user device. In this way, the assistant device functions may remain active when certain individuals are speaking on the call, but may be paused when other individuals are speaking on the call, such as when the user device is shared with a family member. In embodiments, the user device may provide a resume instruction when a mute function the user device is activated (e.g., such that the assistant device may respond to speech while the call is on mute). The user device may provide a pause instruction when the mute function is discontinued.

In embodiments, the user device may provide a pause instruction to a cloud server that is registered to one or more assistant devices, and the cloud server may in turn, provide the pause instruction to the registered assistant devices (e.g., to facilitate pausing of multiple assistant devices without the need for the user device to connect with all the assistant devices directly). In embodiments, the pause instruction may identify the location of the user device, and the cloud server may provide the pause instruction to registered assistant devices only when the location of the user device is within a threshold distance of the assistant devices (e.g., to prevent the assistant devices from being paused when the user device is not located near the assistant devices).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
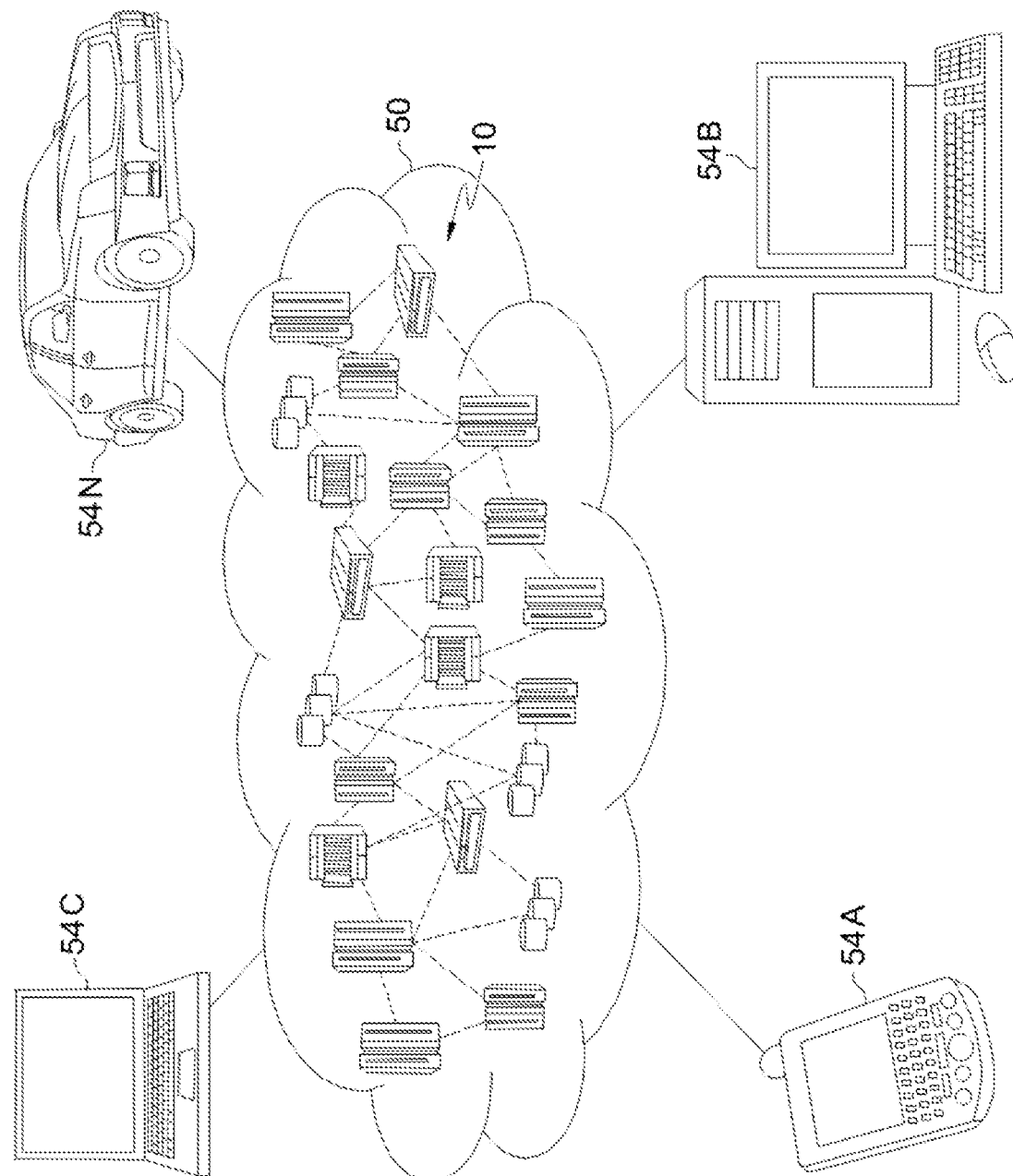
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
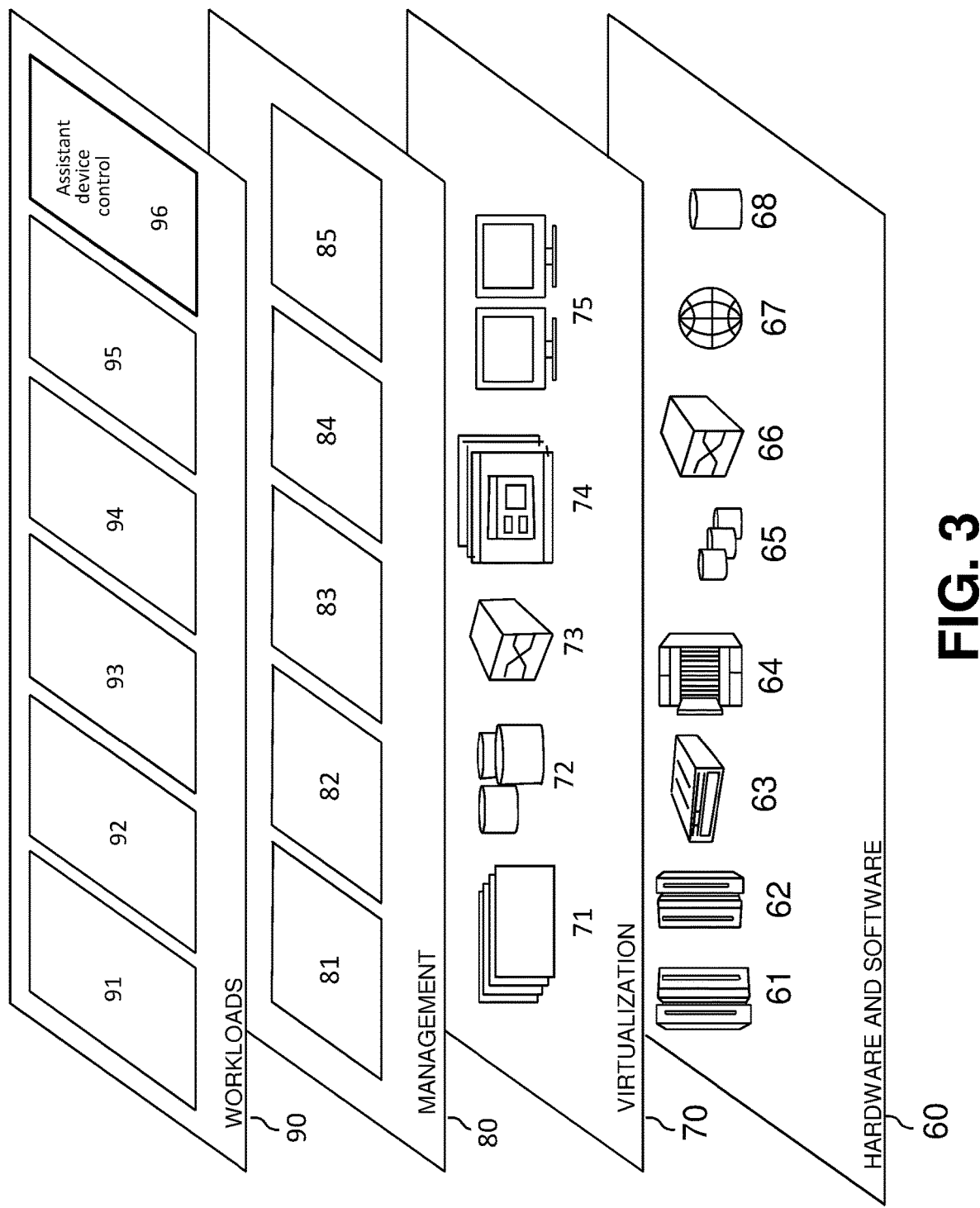
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assistant device control 96.

Referring back to FIG. 1, the program/utility 40 may include one or more program modules 42 that generally carry out the functions and/or methodologies of embodiments of the invention as described herein (e.g., such as the functionality provided by assistant device control 96). Specifically, the program modules 42 may monitor calling activity on a user device, provide an assistant device pause instruction when a call begins on the user device, and provide an assistant device pause instruction when a call ends on the user device. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a user device as shown in FIG. 4.

Figure 4:
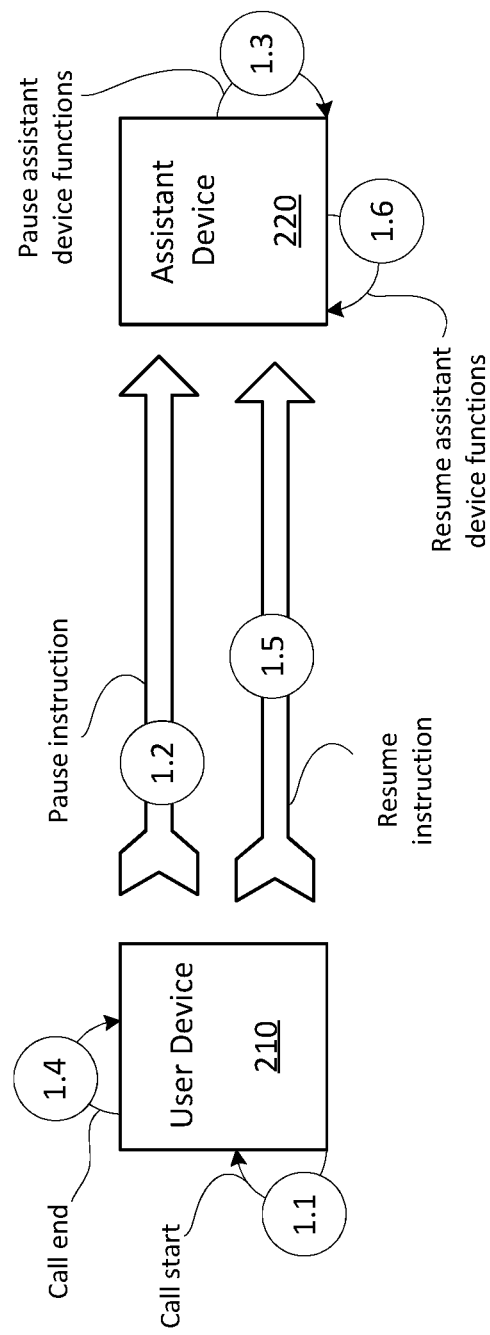
FIG. 4 shows an overview of an example implementation in accordance with aspects of the present invention

FIG. 4 shows an overview of an example implementation in accordance with aspects of the present invention. As shown in FIG. 4, a user device 210 may detect the start of a call (at step 1.1). For example, the user device 210 may detect the start of a call when an incoming call is answered or when an outgoing call is placed by a user of the user device 210. Based on detecting the call start, the user device 210 may provide a pause instruction to an assistant device 220 (at step 1.2). For example, the user device 210 may provide the pause instruction to the assistant device 220 based on previously registering with the assistant device 220 and establishing a line of communication with the assistant device 220 (e.g., a Bluetooth connection, communications over a local area network (LAN), etc.). Based on receiving the pause instruction, the assistant device 220 may pause its functions such that the assistant device 220 may not respond to speech from the user (at step 1.3). For example, as described herein, the assistant device 220 may mute its microphone such that no speech input is received. Alternatively, the assistant device 220 may simply ignore speech while the functions are paused. For example, the assistant device 220 may ignore all speech including a wake command and/or other command that would ordinarily trigger a response from the assistance device 220.

The user device 210 may continue to monitor calling activity and may detect that the call has ended (at step 1.4). Based on detecting that the call has ended, the user device 210 may provide a resume instruction (at step 1.5) to the assistant device 220. Based on receiving the resume instruction, the assistant device 220 may resume functions and respond to speech from the user (step 1.6). For example, the assistant device 220 may un-mute its microphone and/or resume to respond to speech received through its microphone.

As described herein, the pause and resume instructions may be provided to the assistant device 220 via an assistant cloud control device. Additionally, or alternatively, the pause and resume instructions may be provided based on the satisfaction criteria relating to the call activity. For example, a pause instruction may be provided based on voice recognition criteria that identifies a particular user (e.g., such that the pause notification is only provided when a certain individual is using the user device 210 for the call). Additionally, or alternatively, a resume instruction may be provided based on a mute function on the user device 210 being activated, and a pause instruction may be provided based on the mute function being discontinued or deactivated.

Figure 5:
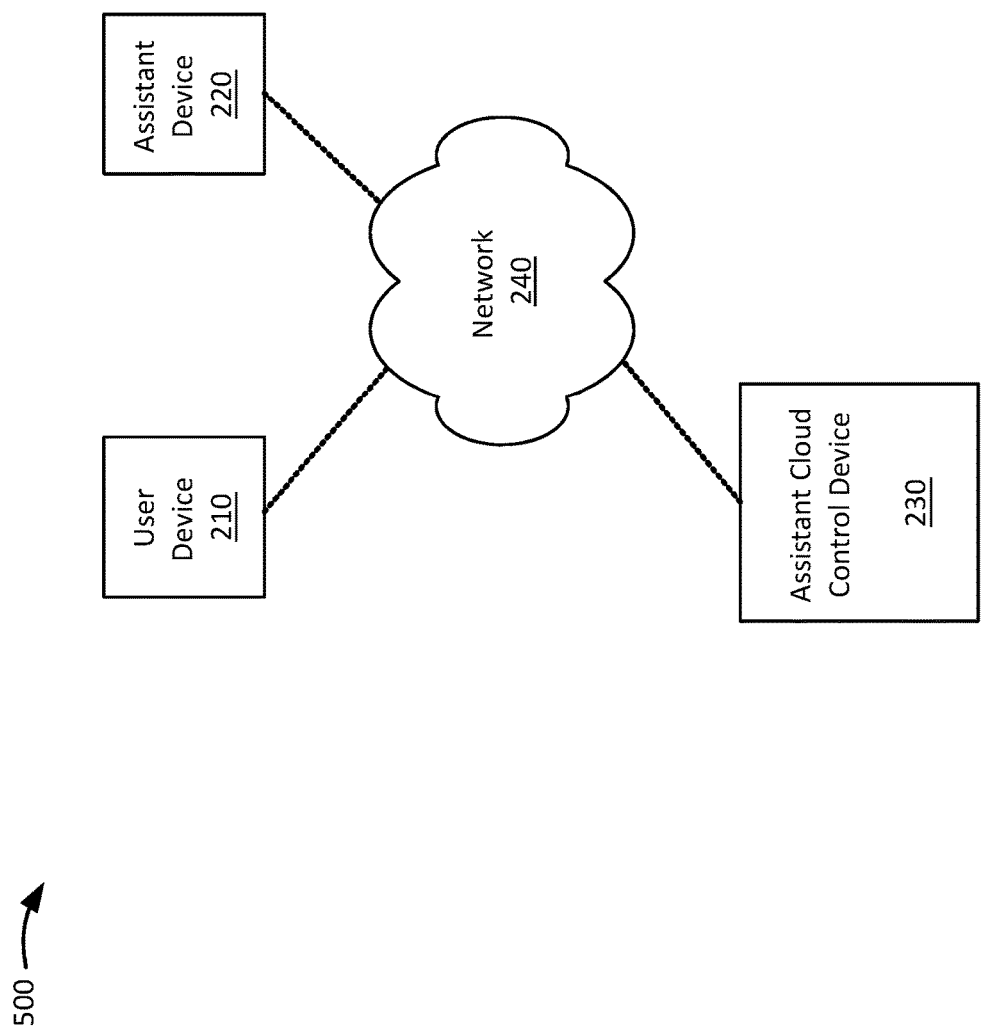
FIG. 5 shows an example environment in accordance with aspects of the present invention.

FIG. 5 shows an example environment in accordance with aspects of the present invention. As shown in FIG. 5, environment 500 may include a user device 210, an assistant device 220, an assistant cloud control device 230, and a network 240. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a computing device capable of communicating via a network, such as the network 240. For example, the user device 210 may correspond to a mobile communication device (e.g., a smart phone or a personal digital assistant (PDA)), a portable computer device (e.g., a laptop or a tablet computer), or another type of device. In some embodiments, the user device 210 may be used to place and/or receive telephone calls (e.g., cellular telephone calls, voice over internet protocol (VoIP) telephone calls, or the like). The user device 210 may monitor calling activity and may provide a pause instruction to the assistant device 220 (e.g., directly or via the assistant cloud control device 230) when a call begins. The user device 210 may also provide a resume instruction when the call ends. The user device 210 may also maintain a voice profile of one or more users to identify which user is speaking into an audio input of user device 210, and may provide a pause instruction when a particular individual is speaking.

The assistant device 220 may include an electronic computing device that responds to voice input by performing a corresponding function associated with a voice command. For example, the assistant device 220 may implement speech recognition techniques/voice print matching techniques to identify a command, and perform a corresponding action. The assistant device 220 may receive a pause command from the user device 210 (e.g., directly from the user device 210 or via the assistant cloud control device 230) when a call begins on the user device 210. The assistant device 220 may receive a resume command from the user device 210 (e.g., directly from the user device 210 or via the assistant cloud control device 230) when a call ends on the user device 210. As described herein, the assistant device 220 may receive a control instruction (e.g., a pause and/or resume instruction) based on the satisfaction of other criteria in addition to the status of calling activity (e.g., the status of a mute function on the user device 210). As described herein, the assistant device 220 may pause functions and may not respond to verbal commands by muting a microphone/audio input or by ignoring verbal input receives.

The assistant cloud control device 230 may include one or more computing devices (e.g., such as computer system/server 12 of FIG. 1) that receives a control instruction (e.g., a pause and/or resume instruction) from a user device 210 (e.g., when a call begins or ends on the user device 210). Based on receiving the control instruction, the assistant cloud control device 230 may identify one or more assistant devices 220 registered to the user device 210 and provide the instruction the registered assistant devices 220. For example, the control instruction may include an identifier of the user device 210 (e.g., a subscriber identity module (SIM) card identifier, an international mobile equipment identifier (IMEI), etc.). The instruction may also include location information of the user device 210. The assistant cloud control device 230 may provide the instruction to the registered assistant devices 220 when the location of the user device 210 is within a threshold distance of registered and known locations of the assistant devices 220.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
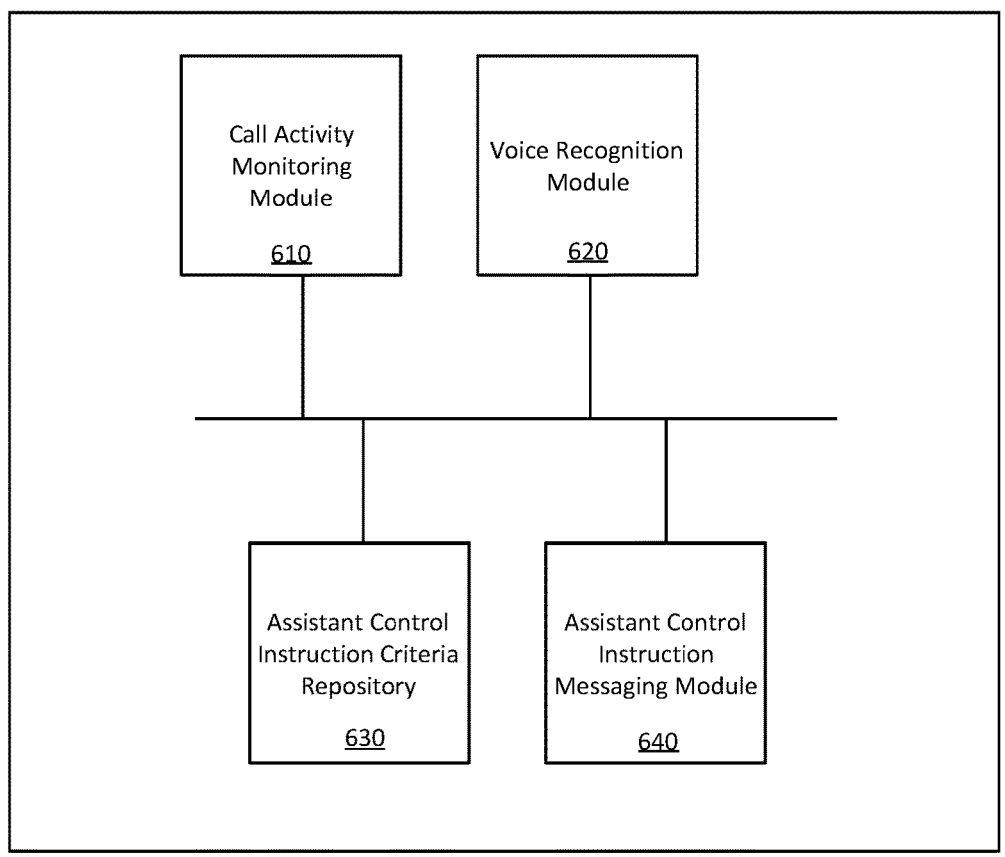
FIG. 6 shows a block diagram of example components of a user device in accordance with aspects of the present invention.

FIG. 6 shows a block diagram of example components of a user device in accordance with aspects of the present invention. As shown in FIG. 6, the user device 210 may include a call activity monitoring module 610, a voice recognition module 620, an assistant control instruction criteria repository 630, and an assistant control instruction messaging module 640. In embodiments, the user device 210 may include additional or fewer components than those shown in FIG. 6. In embodiments, separate components may be integrated into a single computing component or module. Additionally, or alternatively, a single component may be implemented as multiple computing components or modules.

The call activity monitoring module 610 may include a program module (e.g., program module 42 of FIG. 1) that monitors calling activity on user device 210. Specifically, the call activity monitoring module 610 may identify when a call is placed or answered via the user device 210. Also, the call activity monitoring module 610 may identify when a call has ended. The call activity monitoring module 610 may also monitor other calling activity, such as when a mute function of the user device 210 is activate/deactivated during an active call.

The voice recognition module 620 may include a program module (e.g., program module 42 of FIG. 1) that identifies a particular user voice captured via an audio input of user device 210. The voice recognition module 620 may identify a particular user voice based on voice profiles stored over time of user voices. As described herein, information identify a particular individual's voice may be used as criteria for sending a control instruction.

The assistant control instruction criteria repository 630 may include a data storage device (e.g., storage system 34 of FIG. 1) that stores criteria that, when satisfied, direct the assistant control instruction messaging module 640 to output a control instruction for pausing and/or resuming functions on the assistant device 220. For example, the assistant control instruction criteria repository 630 may store criteria that stipulate that a pause instruction should be provided immediately when a call begins. Additionally, or alternatively, the assistant control instruction criteria repository 630 may store criteria that stipulate that a pause instruction should be provided after a period of time from when a call begins. Additionally, or alternatively, the assistant control instruction criteria repository 630 may store criteria that stipulate that a pause instruction should be provided only when a particular individual is speaking in an audio input of the user device 210 (e.g., as identified by the voice recognition module 620).

Additionally, or alternatively, the assistant control instruction criteria repository 630 may store criteria that stipulate that a pause instruction should be provided when a call is placed to or received from a particular individual. For example, the criteria may stipulate that the pause instruction should be provided when a call is placed to or received from a particular individual with a particular name (e.g., as determined from an address book or list of contacts that identifies the name of the individual on the call based on a telephone number of the particular individual). In embodiments, the criteria may stipulate that a pause instruction should be provided when a call is placed to or received from an individual having a similar name as the name or "wake" command of the assistant device 220. For example, as is understood by those of ordinary skill in the art, the assistant device 220 may be named and the user may speak the name of the assistant device 220 in order to "wake" the assistant device. By implementing a criterion that stipulates that a pause instruction be provided when a call is placed to or received from an individual having a similar name as the name or "wake" command of the assistant device 220, the assistant device 220 may be prevented from inadvertently responding to verbal commands during a call with an individual having a similar name as the assistant device 220.

Additionally, or alternatively, the assistant control instruction criteria repository 630 may store criteria that stipulate that a resume instruction be provided immediately after a call ends, a period of time after the call ends, and/or when a mute function of user device 210 is activated. Additionally, or alternatively, the assistant control instruction criteria repository 630 may store criteria that stipulate that a pause instruction be provided when a mute function of user device 210 is deactivated. Additionally, or alternatively, the assistant control instruction criteria repository 630 may store criteria that stipulate that a control instruction be provided when the user device 210 is located within a threshold distance of a particular location associated with a fixed or known location of assistant devices 220 associated with the user (e.g., a particular set of longitude/latitude coordinates, street address, etc.).

The assistant control instruction messaging module 640 may include a program module (e.g., program module 42 of FIG. 1) that detects the satisfaction of control instruction criteria, and provides a message with a control instruction based on detecting the satisfaction of the criteria. For example, the assistant control instruction messaging module 640 may detect that criteria has been satisfied for providing a pause instruction (e.g., when a call starts on user device 210, when a mute function is deactivated, when the user device 210 is within a threshold distance of a known fixed location of assistant device 220, when a particular user is using user device 210 during a call based on voice recognition of that user, etc.) As another example, the assistant control instruction messaging module 640 may detect that criteria has been satisfied for providing a resume instruction (e.g., when a call ends, when a mute function is activated during an active call, etc.).

The assistant control instruction messaging module 640 may provide the control instruction as a message directly to assistant device 220. Alternatively, the assistant control instruction messaging module 640 may provide the control instruction to the assistant cloud control device 230, and the assistant cloud control device 230 may in turn provide the control instruction to one or more registered assistant devices 220 registered the user device 210. In embodiments, the message containing the control instruction may include identification information for the user device 210 so that the assistant cloud control device 230 may identify the assistant devices 220 registered to the user device 210. Additionally, or alternatively, the message containing the control instruction may include location information for the user device 210 such that the assistant cloud control device 230 may determine whether the control instruction should be provided to the assistant devices 220 based on whether the user device 210 is within a threshold distance of the known locations of the assistant devices 220.

Figure 7:
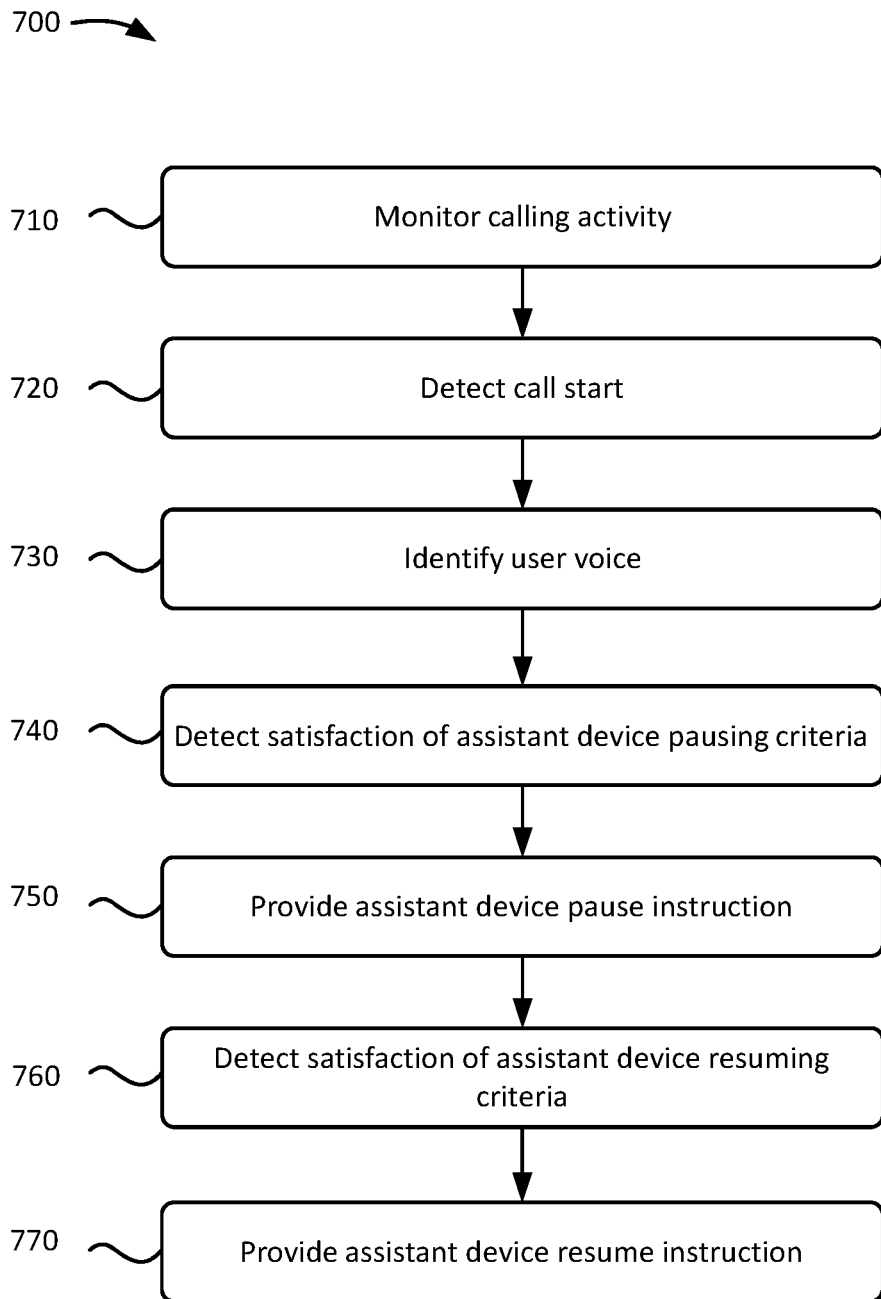
FIG. 7 shows an example flowchart of a process for controlling an assistant device based on calling activity in accordance with aspects of the present invention.

FIG. 7 shows an example flowchart of a process for controlling an assistant device based on calling activity. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention. The process of FIG. 7 may include communications between a user device 210 and one or more assistant devices 220 that have been previously registered to the user device 210 and for which a line of communication between the user device 210 and the one or more assistant devices 220 has been established (e.g., via a Bluetooth connection, LAN, and/or via the assistant cloud control device 230).

As shown in FIG. 7, process 700 may include monitoring calling activity (step 710). For example, as described above with respect to the call activity monitoring module 610, the user device 210 may monitor calling activity to identify when a call is placed or answered via the user device 210 and to identify when a call has ended. The user device 210 may also monitor other calling activity, such as when a mute function of the user device 210 is activate/deactivated during an active call. The user device 210 may monitor the calling activity throughout process 700 as described herein.

Process 700 include detecting a call start (step 720). For example, the user device 210 may detect when a call has started based on monitoring calling activity. Process 700 may also include identifying a user voice (step 730). For example, as described above with respect to the voice recognition module 620, the user device 210 may identify a particular user voice captured via an audio input of user device 210. The user device 210 may identify a particular user voice based on voice profiles stored over time of user voices.

Process 700 may further include detecting the satisfaction of assistance device pausing criteria (step 740). For example, as described above with respect to the assistant control instruction messaging module 640, the user device 210 may detect that criteria has been satisfied for providing a pause instruction (e.g., when a call starts on user device 210, when a mute function is deactivated, when the user device 210 is within a threshold distance of a known fixed location of assistant device 220, when a particular user is using user device 210 during a call based on voice recognition of that user, etc.).

Process 700 may also include providing an assistant device pause instruction (step 750). For example, as described above with respect to the assistant control instruction messaging module 640, the user device 210 may provide the assistant device pause instruction based on detecting the satisfaction of assistant device pausing criteria. In embodiments, the user device 210 may provide the pause instruction to the assistant device 220 directly or via the assistant cloud control device 230. As described above, when an instruction is provided via the assistant cloud control device 230, the assistant cloud control device 230 may provide the instruction to registered assistant devices 220 and may perform additional processing prior to providing the instruction (such as determining whether the instruction should be provided to the registered assistant devices 220 based on a location of the user device 210 and known locations of the assistant devices 220).

Process 700 may further include detecting the satisfaction of assistant device resuming criteria (step 760). For example, as described above with respect to the assistant control instruction messaging module 640, the user device 210 may detect that criteria has been satisfied for providing a resume instruction (e.g., when a call ends, when a mute function is activated during an active call, etc.).

Process 700 may also include providing an assistant device resume instruction (step 770). For example, as described above with respect to the assistant control instruction messaging module 640, the user device 210 may provide the assistant device resume instruction based on detecting the satisfaction of assistant device resuming criteria. In embodiments, the user device 210 may provide the resume instruction to the assistant device 220 directly or via the assistant cloud control device 230.

Figure 8:
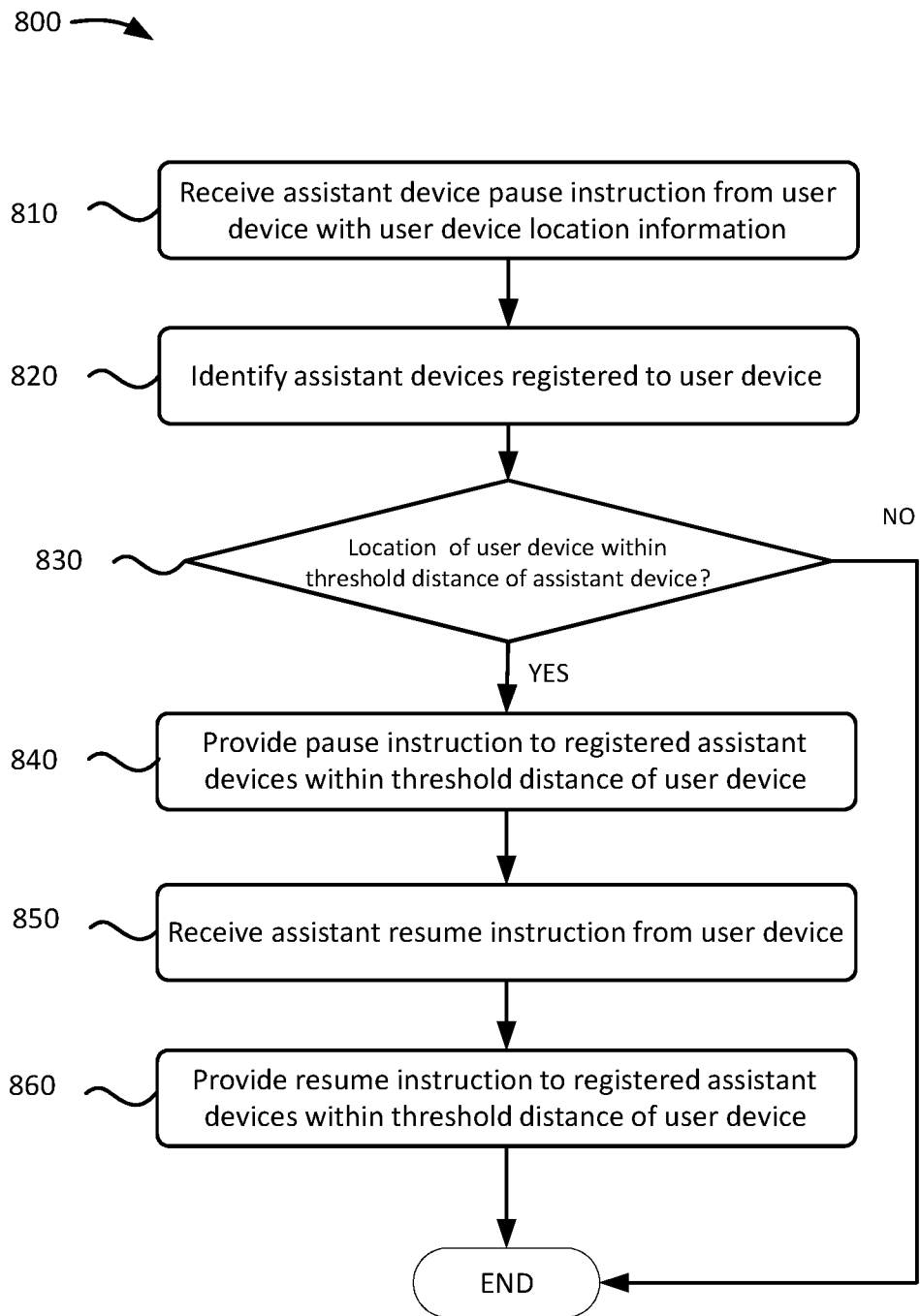
FIG. 8 shows an example flowchart of a process for controlling an assistant device via an assistant cloud control device based on calling activity on a user device in accordance with aspects of the present invention.

FIG. 8 shows an example flowchart of a process for controlling an assistant device via an assistant cloud control device based on calling activity on a user device. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 8, process 800 may include receiving an assistant device pause instruction a user device with user device location information (step 810). For example, the assistant cloud control device 230 may receive an assistant device pause instruction a user device with user device location information from user device 210 (e.g., when the user device 210 detects the satisfaction of pausing instruction criteria as discussed above with respect to FIG. 7). Further, the pause instruction may include information identifying the user device 210.

Process 800 may further include identifying assistant devices registered to the user device (step 820). For example, the assistant cloud control device 230 may identify assistant devices 220 registered to the user device 210 (e.g., by looking up the identification information of the user device 210 in a data structure). The assistant cloud control device 230 may also identify a known or registered location of the registered assistant devices 220 as stored by the data structure.

Process 800 may also include determining whether the location of the user device is within a threshold distance of the assistant devices (step 830). For example, the assistant cloud control device 230 may compare the location of the user device 210 with information identifying the registered location of the assistant devices 220. In embodiments, the some assistant devices 220 may be registered to one location whereas other assistant devices 220 may be registered to another location (e.g., some assistant devices 220 may be registered to a user's place of employment, whereas others may be registered to the user's home).

If, for example, the location of the user device 210 is within a threshold distance of the assistant devices 220, (step 830—YES), process 800 may include providing pause instructions to the registered assistant devices 220 within the threshold distance of the user device 210 (step 840). For example, the assistant cloud control device 230 may provide the pause instructions to the registered assistant devices 220 within the threshold distance of the user device 210. The assistant cloud control device 230 may not provide the pause instruction to assistant devices 220 that are outside of the threshold distance and process 800 may end (e.g., step 830—NO). In this way, the pause instruction is only provided to assistant devices 220 that are at or near the user device 210 (e.g., to prevent the functions of assistant devices 220 from inadvertently being paused when a call is started on the user device 210 and when the user device 210 is not located near the assistant devices 220).

Process 800 may further receiving an assistant resume instruction from the user device (step 850) and providing the resume instruction to the registered assistant devices within the threshold distance of the user device 210 (step 860). For example, the assistant cloud control device 230 may receive an assistant resume instruction from the user device 210 (e.g., when the user device 210 detects the satisfaction of resuming criteria, such as when a call ends, a mute functions is activated on user device 210, etc.). Assistant cloud control device 230 may further provide the resume instruction to the registered assistant devices within the threshold distance of the user device 210. Use of the assistant cloud control device 230 may streamline the dissemination of the control instructions (e.g., the pause/resume instructions) to multiple assistant devices 220.

Figure 9:
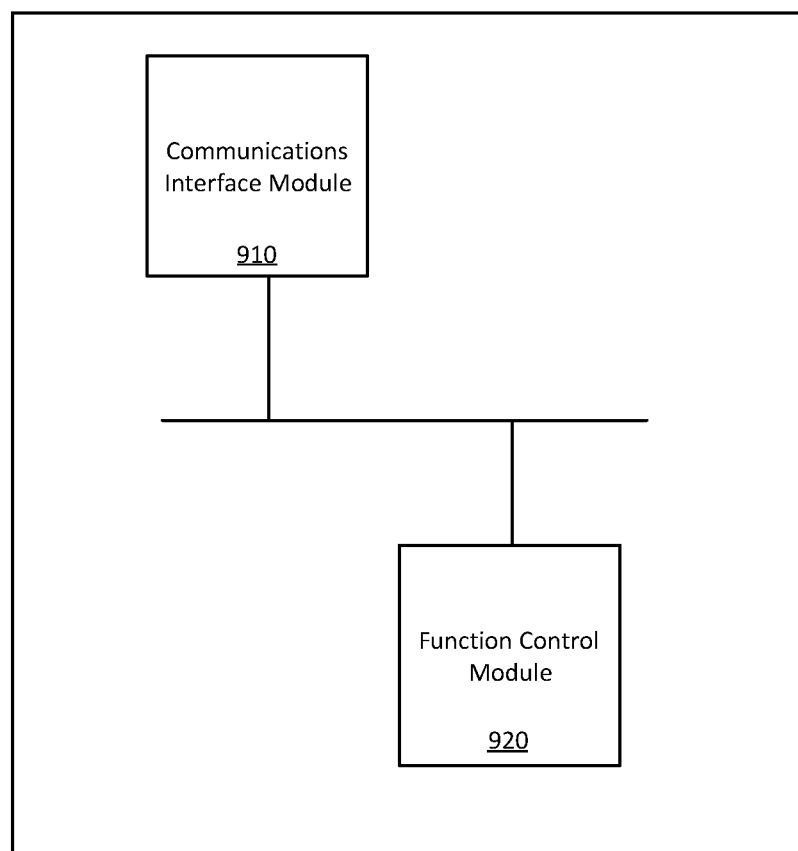
FIG. 9 shows a block diagram of example components of an assistant device in accordance with aspects of the present invention.

FIG. 9 shows a block diagram of example components of an assistant device in accordance with aspects of the present invention. As shown in FIG. 9, the assistant device 220 may include a communications interface module 910 and a function control module 920. In embodiments, the assistant device 220 may include additional or fewer components than those shown in FIG. 9. In embodiments, separate components may be integrated into a single computing component or module. Additionally, or alternatively, a single component may be implemented as multiple computing components or modules.

The communications interface module 910 may include an interface module (e.g., I/O interface 22 of FIG. 1) that may communicate with the user device 210 directly. For example, the communications interface module 910 may include a personal area network (PAN) radio (e.g., a Bluetooth radio) and/or other type of PAN hardware via which a direct communications link between the user device 210 and the assistant device 220 may be established. Additionally, or alternatively, the communications interface module 910 may include a network adapter to connect to a network (e.g., network 240) of FIG. 5 in order to communicate with user device 210 and/or assistant cloud control device 230. The communications interface module 910 may receive control instructions directly from the user device 210 or via the assistant cloud control device 230. For example, as described herein, the communications interface module 910 may receive a control instruction based on calling activity of the user device 210 and/or based on the satisfaction of criteria stipulating conditions under which control instructions are provided (e.g., when a call starts, when a mute function on the user device 210 is deactivated, etc.).

The function control module 920 may include a program module (e.g., program module 42 of FIG. 1) that controls the functions of the assistant device 220. In particular, the assistant device 220 may pause voice command response functions of assistant device 220 based on receiving a pause instruction. For example, the function control module 920 may mute a microphone or audio input of the assistant device 220 such that no speech input is received. Alternatively, the assistant device may simply ignore speech input while the functions are paused/disabled. The function control module 920 may resume pause voice command response functions of assistant device 220 based on receiving a pause instruction based on receiving a resume instruction (e.g., by un-muting the microphone of the assistant device 220 and/or by resuming to respond to speech received through the microphone/audio input device).

Figure 10:
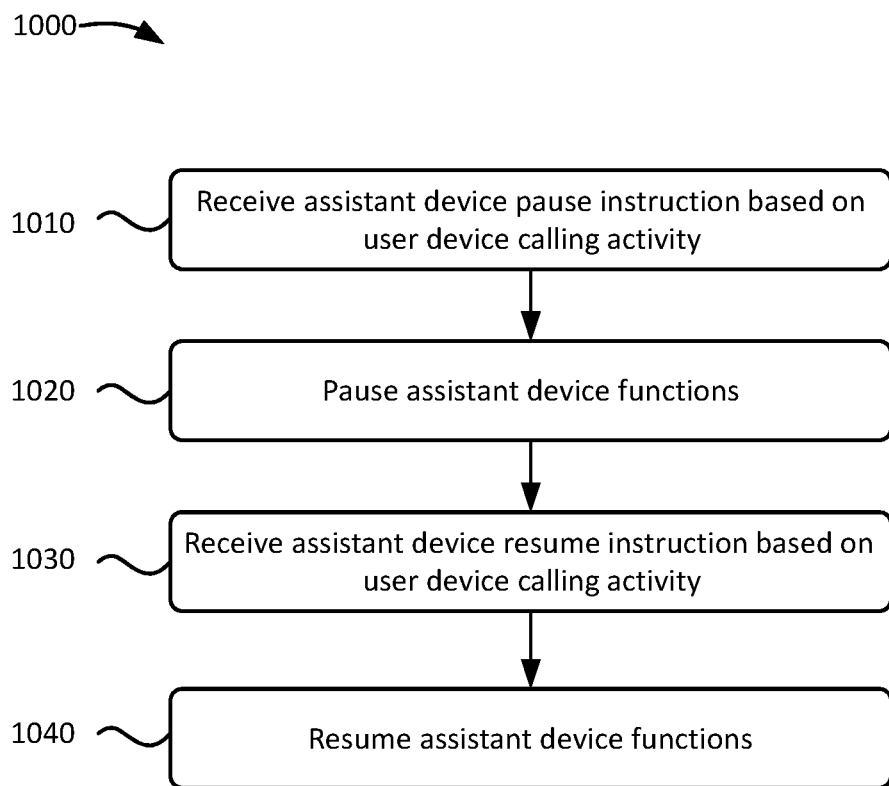
FIG. 10 shows an example flowchart of a process for controlling an assistant device based on calling activity in accordance with aspects of the present invention.

FIG. 10 shows an example flowchart of a process for controlling an assistant device based on calling activity. The steps of FIG. 10 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 10, process 1000 may include receiving an assistant device pause instruction based on user device calling activity (step 1010) and pausing the assistant device functions (step 1020). For example, as described above with respect to the communications interface module 910, the assistant device 220 may receive a control instruction (e.g., a pause instruction) based on calling activity of the user device 210 and/or based on the satisfaction of criteria stipulating conditions under which the pause instruction is provided (e.g., when a call starts, when a mute function on the user device 210 is deactivated, etc.). The assistant device 220 may receive the pause instruction from the user device 210 directly or via the assistant cloud control device 230. Based on receiving the pause instruction, the assistant device 220 may pause its functions as described herein.

Process 1000 may further include receiving an assistant device resume instruction based on user device calling activity (step 1030) and resuming assistant device functions (step 1040). For example, as described above with respect to the communications interface module 910, the assistant device 220 may receive a control instruction (e.g., a resume instruction) based on calling activity of the user device 210 and/or based on the satisfaction of criteria stipulating conditions under which the resume instruction is provided (e.g., when a call ends, when a mute function on the user device 210 is activated, etc.). The assistant device 220 may receive the pause instruction from the user device 210 directly or via the assistant cloud control device 230. Based on receiving the pause instruction, the assistant device 220 may resume its functions as described herein.

As is understood by those with ordinary skill in the art, the assistant device 220 may play radio stations (e.g., via a network connection or other type of communications interface). In some situations, a radio program (e.g., a talk radio show) may inadvertently trigger the assistant device 220 (e.g., when a name or "wake" command is spoken during the radio show, such as when a host or individual on the radio show has a similar name as the name of the assistant device 220). Accordingly, the assistant device 220 may pause its functions when a particular radio station is playing during a particular time, corresponding to when a radio program in which a similar name as the assistant device 220 is often spoken. In this way, the assistant device 220 may be prevented from inadvertently activating itself and responding to verbal commands. In embodiments, when the assistant device 220 is paused, the assistant device 220 may be controlled via another means (e.g., an alternate wake command, via a companion device, such as a smart phone, tablet, desktop/laptop computer, etc.).

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a user device to cause the user device to:
   monitor calling activity on the user device;
   detect, based on the monitoring, that a call has started on the user device;
   provide a pause instruction to an assistant device based on the detecting that the call has started on the user device, the pause instruction causing the assistant device to disable speech response functions of the assistant device; and
   provide a resume instruction to the assistant device based on detecting during the monitoring calling activity on the user device that a mute function of the user device has been activated,
   wherein the providing the pause instruction and the resume instruction further comprises providing location information of the user device.

2. The computer program product of claim 1, wherein providing the pause instruction causes the assistant device to perform at least one selected from the group consisting of:
   muting an audio input device of the assistant device; and
   ignoring speech input received by the audio input device.

3. The computer program product of claim 2, wherein providing the resume instruction causes the assistant device to perform at least one selected from the group consisting of:
   unmute the audio input device of the assistant device; and
   resume responding to speech input received by the audio input device.

4. The computer program product of claim 2, wherein providing the pause instruction comprises the ignoring speech input received by the audio input device, and the ignoring speech input received by the audio input device includes ignoring a wake command.

5. The computer program product of claim 1, wherein the program instructions further cause the user device to provide a subsequent pause instruction to the assistant device based on detecting during the monitoring calling activity on the user device that the mute function of the user device has been deactivated.

6. The computer program product of claim 1, wherein providing the pause instruction and the resume instruction comprises providing the pause instruction and the resume instruction to the assistant device via an assistant cloud control device, and wherein the pause instruction and the resume instructions cause the assistant cloud control device to provide the pause instruction and the resume instruction to a plurality of assistant control devices registered to the user device.

7. The computer program product of claim 1, wherein the assistant device is a computing device configured to respond to voice inputs by performing a function corresponding to the respective voice inputs, and wherein the user device provides the pause instruction and the resume instruction to the assist device via a network.

8. The computer program product of claim 1, wherein providing the pause instruction occurs based on detecting speech from a particular user received via an audio input device of the user device.

9. The computer program product of claim 1, wherein providing the pause instruction occurs based on a name of a particular caller that is on the call.

10. The computer program product of claim 1, wherein providing the pause instruction occurs after a predetermined period of time from when the call begins.

11. A system comprising:
a processor, a computer readable memory and a computer readable storage medium associated with a computing device;
program instructions to receive a pause instruction from a user device based on the user device detecting that a call has started on the user device;
program instructions to identify one or more assistant devices registered to the user device based on the receiving the pause instruction;
program instructions to provide the pause instruction to the one or more assistant devices, the pause instructions causing the one or more assistant devices to disable speech response functions of the respective one or more assistant devices;
program instructions to receive a resume instruction from the user device based on the user device detecting that a call has ended on the user device; and
program instructions to provide the resume instruction to the one or more assistant devices based on the receiving the resume instructions, the resume instruction causing the one or more assistant devices to resume speech response functions,
wherein the computing device receives location information of the user device as part of the receiving the pause instruction, and wherein the identifying the one or more assistant devices is based on the location information, and
wherein the program instructions are stored on the computer readable storage medium for execution by the processor via the computer readable memory.

12. The system of claim 11, further comprising program instruction to receive user device identification information as part of the receiving the pause instruction, wherein the identifying the one or more assistant devices registered to the user device is based on the user device identification information.

13. The system of claim 11, wherein the identifying the one or more assistant devices comprises determining that the user device is within a predetermined threshold distance of respective locations of the one or more assistant devices.

14. The system of claim 11, wherein the pause instruction causes the one or more assistant devices to ignore a wake command.

15. The system of claim 11, wherein a service provider at least one of creates, maintains, deploys and supports the computing device.

16. A computer-implemented method comprising:
receiving, by a computing device, a pause instruction based on a user device detecting that a call has started on the user device;
disabling, by the computing device, speech input response functions based on receiving the pause instruction;
receiving, by the computing device, a resume instruction based on the user device detecting during monitoring of calling activity on the user device that a mute function of the user device has been activated; and
resuming, by the computing device, speech input response functions based on receiving the resume instruction,
wherein the pause instruction and the resume instruction comprise location information of the user device.

17. The computer-implemented method of claim 16, wherein the pause instruction and the resume instruction are received by the computing device via an assistant control cloud device.

18. The computer-implemented method of claim 16, wherein the computing device is an assistant device configured to respond to voice inputs by performing a function corresponding to the respective inputs.

19. The computer-implemented method of claim 18, wherein the pause instruction comprises instructions to perform at least one selected from the group consisting of:
muting an audio input device of the assistant device; and
ignoring speech input received by the audio input device.

20. The computer-implemented method of claim 18, wherein providing the resume instruction comprises instructions to perform at least one selected from the group consisting of:
unmute the audio input device of the assistant device; and
resume responding to speech input received by the audio input device.

* * * * *